US007184876B2

(12) United States Patent
Teulings et al.

(10) Patent No.: US 7,184,876 B2
(45) Date of Patent: Feb. 27, 2007

(54) DEVICE AND PROCESS FOR DETERMINING THE POSITION OF AN ENGINE

(75) Inventors: Willem Teulings, Fontenilles (FR); Frederic Cantie, Toulouse (FR)

(73) Assignee: Siemens VDO Automotive, Toulouse (FR)

( * ) Notice: Subject to any disclaimer, the term of this patent is extended or adjusted under 35 U.S.C. 154(b) by 0 days.

(21) Appl. No.: 11/155,675

(22) Filed: Jun. 20, 2005

(65) Prior Publication Data

US 2005/0283300 A1 Dec. 22, 2005

Related U.S. Application Data

(60) Provisional application No. 60/666,800, filed on Mar. 30, 2005.

(30) Foreign Application Priority Data

Jun. 18, 2004 (FR) .................................. 04 06625

(51) Int. Cl.
*F02D 43/04* (2006.01)
*G01M 15/06* (2006.01)

(52) U.S. Cl. ...................... 701/103; 701/115; 123/476; 123/617; 73/118.1; 324/207.25

(58) Field of Classification Search ..................... None
See application file for complete search history.

(56) References Cited

U.S. PATENT DOCUMENTS 4,145,608 A * 3/1979 Shirasaki et al. ...... 250/231.14
4,329,645 A * 5/1982 Takase .................. 324/207.25
4,854,284 A * 8/1989 Hara et al. ............. 123/406.52
4,966,116 A * 10/1990 Sakurai Hidetoshi .. 123/406.18
5,568,048 A 10/1996 Schroeder et al.
2002/0057084 A1 5/2002 Preymann

FOREIGN PATENT DOCUMENTS

EP 1 186 894 3/2002

* cited by examiner

*Primary Examiner*—Andrew M. Dolinar
(74) *Attorney, Agent, or Firm*—Young & Thompson

(57) ABSTRACT

Device for determining the position of an engine includes:

a sensor that has a rotary part and a fixed part, whereby said fixed part comprises:

- elements (for generating a first signal based on the position of the rotary part relative to the fixed part),
- Second elements for generating a second phase-shifted signal relative to the first signal,
- elements for comparing the value of the second signal to a reference value,
- elements for detecting at least one characteristic event on the first signal, for generating a third signal of binary type, and for alternating the binary signal from a first value to a second after detection of at least one of the characteristic events if the result of the comparison is positive, engine control elements that include members for detecting the alternations of third signal and a counter.

16 Claims, 2 Drawing Sheets

DEVICE AND PROCESS FOR DETERMINING THE POSITION OF AN ENGINE

BACKGROUND OF THE INVENTION

The invention relates to a device and a process for determining the position of an internal combustion engine comprising a rotary element.

It is useful to know with precision the position of an internal combustion engine, in particular so as to improve its start-up and more specifically to reduce the start-up time, and even to allow the direct start-up of the engine without a starter. Actually, a better knowledge of the position of the engine makes it possible to select cylinders that are to be supplied with fuel, to determine the optimum amount of fuel to be injected, as well as the optimum ignition time.

DESCRIPTION OF THE RELATED ART

Already known is a device that comprises:

A sensor that delivers a signal that takes on discrete values and that comprises a rotary part and a fixed part, whereby said rotary part is linked to the rotary element and comprises a number of essentially identical reference points that are offset angularly by one increment, whereby said fixed part comprises:
- First means for generating a first signal based on the relative position of the reference points relative to the fixed part,
- Second means for generating a second signal based on the relative position of the reference points relative to the fixed part, whereby said first signal and second signal are similar but phase-shifted,
- Means of analysis connected to first means and to second means, whereby said means of analysis comprise third means for detecting a characteristic event on the first signal and fourth means for generating a third signal of binary type that takes on a first value or a second value, whereby said fourth means generate an alternation of the third signal between the first value and the second value after detection of the characteristic event on the first signal, Engine control means connected to means of analysis of the sensor, whereby said engine control means comprise:
- A counter that is intended to represent the position of the rotary element,
- Fifth means for detecting the alternations of the third signal between the first and second values and to modify the counter based on said alternations, Sixth means for generating actions on engine elements such as spark plugs or fuel injectors based on the value of the counter.

If this device proves satisfactory, however, when the engine always rotates in the same direction, by contrast it no longer makes it possible to know precisely the position of the engine if the latter is reversed. For example, when the internal combustion engine is in stop phase, it oscillates around a mechanical equilibrium position. During this stop phase when the rotation direction varies continuously, the device of the prior art makes errors in enumerating events, and it therefore is no longer possible to know the position of the engine.

Actually, the number of reference points consists in particular of the succession of hollows and teeth of a gear and the characteristic event that appears on the first signal generally consists of the shifting of a reference value either upward or downward. The reference value conventionally corresponds to the mean value of this first signal. For various technical reasons and in particular the compatibility between the devices of different generations, a single type of shifting is detected by the reference value. Thus, the choice may be made to relate the determination of a tooth (respectively of the hollow according to the protocol selected) to the first signal passing the reference value on the upswing. The choice may also be made to relate the determination of a tooth (respectively a hollow according to the protocol selected) to the first signal passing the reference value on the downswing.

It appeared, however, that such a device delivers erroneous information when the internal combustion engine is reversed. Actually, even though the shifting of the reference value upward (for example) of the first signal corresponds physically to the shifting of a tooth in a direction of rotation, the shifting of the reference value in the upward direction in the other direction of rotation no longer corresponds physically to the shifting of a tooth (but rather a hollow). The sensor therefore signals teeth in a given direction and hollows in the other direction. Consequently, the means of analysis are induced erroroneously by this confusion.

SUMMARY OF THE INVENTION

The purpose of the invention is to eliminate this drawback for a moderate cost and by preserving the compatibility with the preceding generations of sensors, in other words by detecting only the shifting of teeth (respectively, hollows), in addition to the direction of rotation, regardless of the latter.

To do this, according to the invention, the means of analysis comprise, in addition;
- Means of comparison to compare the value of the second signal to a reference value, when a characteristic event is detected on the first signal,
- Control means for controlling fourth means for alternating the third signal between the first value and the second value only when a characteristic event is detected on the first signal and when the result of the comparison is positive.

Thus, regardless of the direction of rotation of the engine, the same mechanical events (for example the shifting of a tooth) are always physically detected. Consequently, the means of analysis are no longer induced erroneously. The position of the engine is therefore correctly known even if the engine is reversed;

However, as mentioned above, the internal combustion engine has a tendency to oscillate before stopping. According to another advantageous characteristic in accordance with the invention, the device exhibits the following characteristics:
- The means of analysis comprise the seventh means for detecting the variation of the first signal when a characteristic event is detected on the first signal and for comparing it to a reference value, and
- The fourth means generate an alternation of the second value with the first value after the second value is held for a period based on the result of the comparison between the variations of the first signal detected by the seventh means with the reference value,
- The fifth means compare to a reference value the period between the alternation of the first value with the second value and the alternation of the second value with the first value and increment or decrement the counter based on the result of this comparison.

Thus, the means of analysis detect the direction of rotation of the engine. Actually, the variation of the value of the counter will be positive when the engine rotates in one direction and negative when it rotates in the other.

The interval between the two successive alternations of the third signal is easily detected by the fifth means.

The value of the counter is therefore always in agreement with the physical position of the rotary element regardless of the direction of rotation and the oscillations of the rotary element.

According to another advantageous characteristic according to the invention, the device exhibits the following characteristics:

The fixed part of the sensor comprises:

- A first probe that generates a fourth essentially sinusoidal signal,
- A second probe that is similar to the first probe, placed close to the first probe and generating a fifth signal that is essentially similar to the fourth signal but phase-shifted relative to the fourth signal,
- Means for subtracting the fifth signal from the fourth signal, generating the first signal, The third means detect the passing of the first signal through the zero value.

Thus, owing to variations in the air gap, temperature, etc., the derivatives that can undergo over time the fourth signal and the fifth signal are attenuated. The device thus has great precision and great strength.

In addition, the device advantageously has the following characteristics:

- The second means comprise a third probe, similar to the first probe and to the second probe, placed approximately in the center of the first and second probes, whereby said second signal varies between a minimum value and a maximum value,
- The means of comparison compare the value of the second signal to its minimum value and/or to its maximum value when the characteristic event is detected on the first signal.

Thus, the first signal and the second signal are both essentially sinusoidal and in phase quadrature. Consequently, when the first signal takes on the zero value, the second signal is approximately at an end value (maximum or minimum). Under these conditions, it is determined with precision which of the shifts of the first signal by the zero value should generate a modification of the counter and which should not modify the counter.

The invention also relates to a process. A process in which a sensor that comprises a fixed part and a rotary part is used is already known, whereby the rotary part comprises a number of essentially identical reference points that are offset angularly by one increment, whereby said sensor generates a first signal and a second signal that are similar but phase-shifted, and a binary signal that takes on a first value or a second value is transmitted from the sensor to the engine control means. Said process comprises the following stages:

a) A characteristic event is detected on the first signal, b) The third signal is alternated from the first to the second value, c) The alternations of the third signal are detected in the engine control means, and the number of alternations of the third signal is counted in a counter, d) Actions on the engine elements such as the spark plugs or the fuel injectors are generated based on the value of the counter.

This process exhibits the above-mentioned drawbacks in relation to the reversal of the direction of rotation. To remedy this, according to the invention, during stage a), in addition, the value of the second signal is compared to a reference value, and stage b) is performed only if the result of the comparison between the value of the second signal and the reference value during stage a) is positive.

According to an advantageous characteristic in accordance with the invention, the following stages are carried out:

- A sensor that generates a fourth signal and a fifth signal that are similar but phase-shifted is used,
- The first signal is generated by subtracting the fifth signal from the fourth signal, and
- During stage a), the passing of the first signal through the zero value is detected.

The precision of the detection of the position of the rotary element is thus improved.

BRIEF DESCRIPTION OF THE DRAWING

The invention will appear even more clearly in the following description, given in reference to the attached drawings, in which.

DESCRIPTION OF THE PREFERRED EMBODIMENTS

Figure 1:
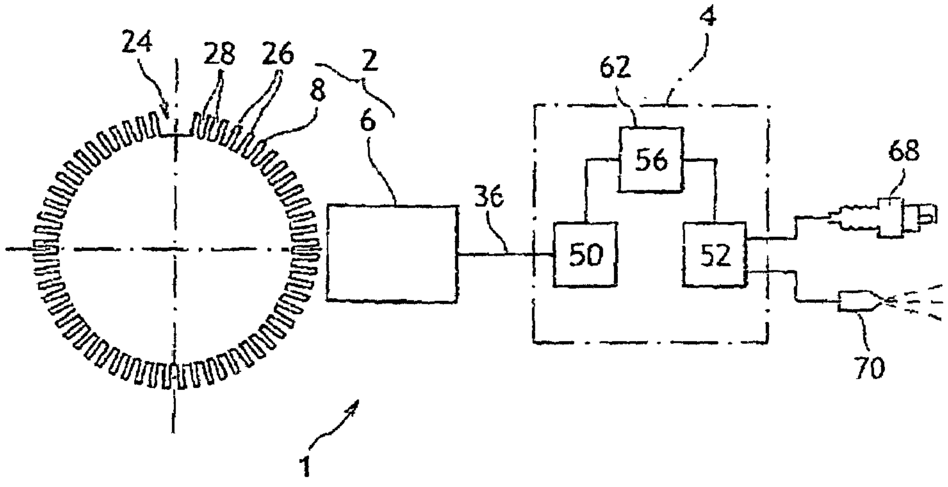
FIG. 1 is a schematic representation of a device in accordance with the invention.

FIG. 1 illustrates a device 1 that essentially comprises a sensor 2 and an engine control unit 4.

Figure 2:
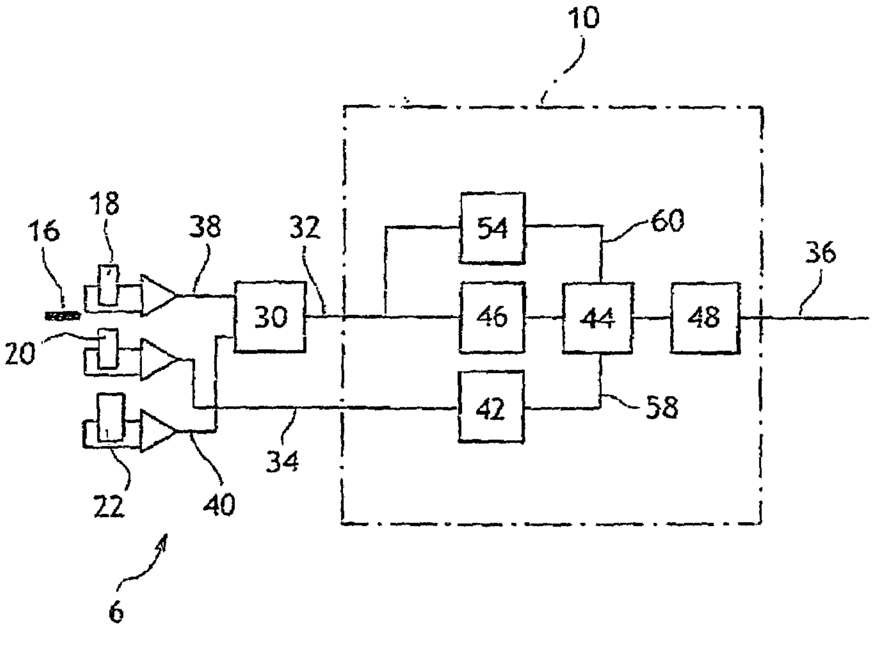
FIG. 2 is a detailed representation of a part of the device of FIG. 1.

Sensor 2 comprises a rotary part 8 that is integral with the crankshaft of the engine and a fixed part 6 that is intended to detect the movements of rotary part 8. Fixed part 6 is shown in more detail in FIG. 2.

Rotary part 8 comprises a ferromagnetic disk 8 that consists of a succession of sixty teeth 26 and sixty hollows 28 that are distributed uniformly, such that teeth 26 (respectively hollows 28) are placed at the periphery of disk 8 every six degrees, which defines a rotation increment of the crankshaft. In fact, two teeth were removed in disk 8 so as to reference a reference position 24 of the crankshaft. Another number of teeth and hollows is also possible without thereby exceeding the scope of this invention.

Figure 3:
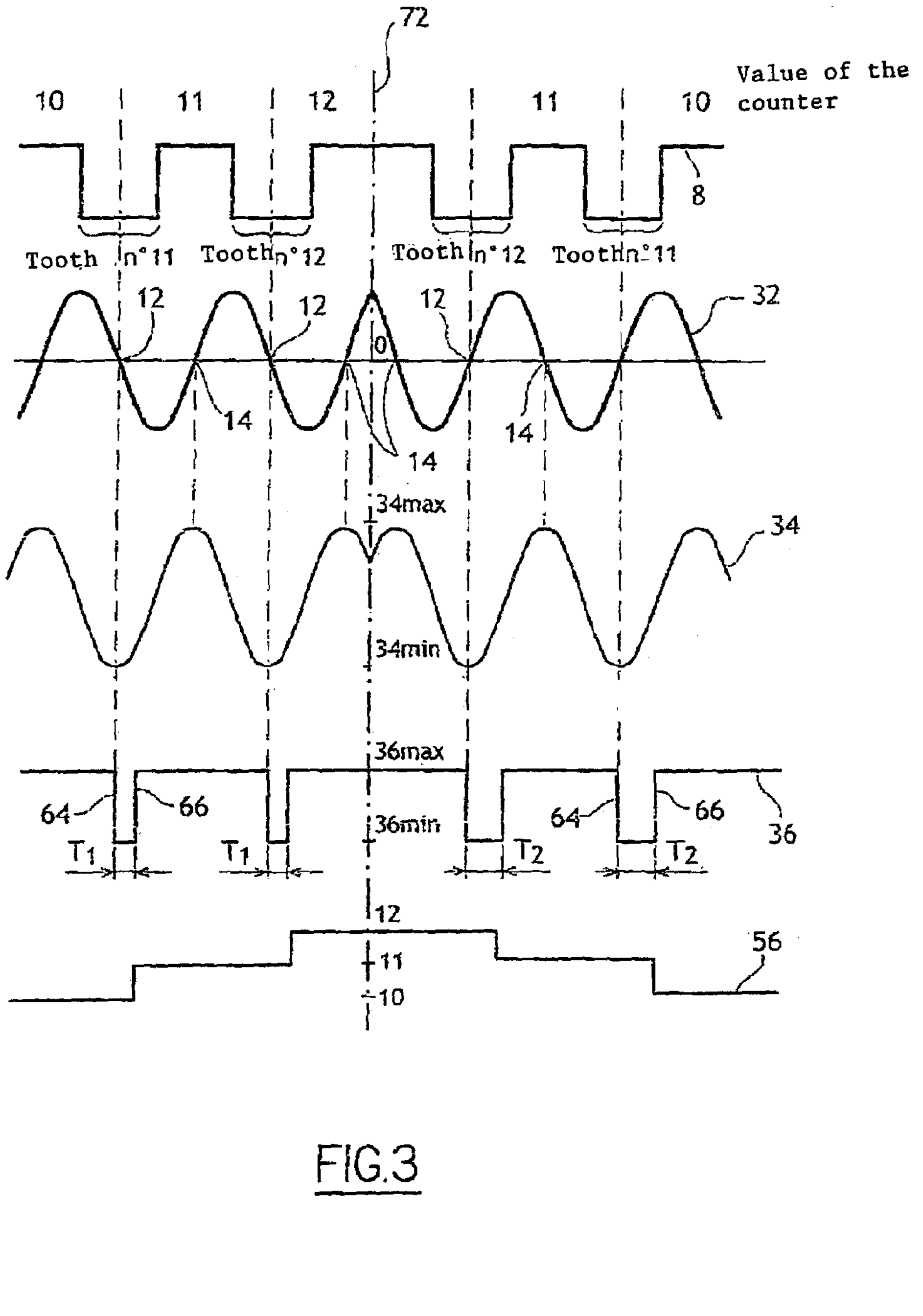
FIG. 3 illustrates different signals that are generated in the device.

Fixed part 6 comprises a magnet, three Hall effect probes or identical magnetoresistive probes of type 18, 20, 22, a subtractor assembly 30 and an analysis unit 10. Magnet 16 generates a magnetic field that is modified by the presence of teeth 26 of disk 8, such that voltage 38, 34, 40 that is detected by probes 18, 20,22 is essentially sinusoidal and based on the position of teeth 26 relative to the probes. As illustrated in FIG. 3, in relation to signal 34, the voltage is maximum when the probe is opposite the tip of a hollow 28. Referenced curve 8 represents the disk as it is seen by fixed part 6 of sensor 2 with its succession of teeth 26 and hollows 28. The numbers that are indicated above teeth 26 correspond to the number of teeth that pass before fixed part 6 of the sensor, counted from reference position 24.

Probe 20 is located in the center of probe 18 and probe 22 short of one tooth width relative to probe 18 and probe 22.

Subtractor assembly 30 generates a signal 32 corresponding to the difference between voltage 38 obtained from probe 18 and voltage 40 obtained from probe 22. As shown in FIG. 3, signal 32 is essentially sinusoidal, exhibits a mean value of close to zero and is in phase quadrature with the signal that is defined by voltage 34 obtained from probe 20.

It should be noted that if the mean value of signal 32 is not close to zero, a continuous elimination of the component can be carried out to bring said mean value to zero.

Signals 32, 34 are entered into analysis unit 10, which detects movements of the crankshaft by one increment of rotation and transmits the information to engine control unit 4. Analysis unit 10 comprises a control unit 44, a detection unit 46, a generator 48 of binary signals 36 and two comparators 54, 42 that receive signals 32, 34 and generate signals 58, 60 that enter into control unit 44.

Detection unit 46 detects passages 12, 14 by signal 32 through the zero value. Control unit 44 then determines whether signal 34 is at its maximum value $\mathbf{34}_{MAX}$ or at its minimum value $\mathbf{34}_{min}$ based on signal 58 that is received from comparator 42. In practice, signal 58 is binary and based on the value of signal 34 relative to the mean between its maximum value $\mathbf{34}_{MAX}$ and its minimum value $\mathbf{34}_{min}$.

When signal 34 is at its minimum value $\mathbf{34}_{min}$, probe 20 is opposite a tooth 26. Disk 38 is shifted by one increment, if it has not changed direction of rotation, between two consecutive passages through minimum value $\mathbf{34}_{min}$ by signal 34. Control unit 44 then controls generator 48 to alternate signal 36 from value $\mathbf{36}_{MAX}$ to the value $\mathbf{36}_{min}$.

To know the direction of rotation, it is determined with comparator 54 and signal 60 that it transmits to control unit 44 whether signal 32 is increasing or decreasing when it passes through the zero value by measuring the value of signal 32 a moment after passing through the zero value.

If signal 32 is negative after passing through the zero value, then the engine rotates in the normal direction, and control unit 44 controls generator 48 to alternate signal 36 from the value $\mathbf{36}_{min}$ to the value $\mathbf{36}_{MAX}$ after remaining at the value $\mathbf{36}_{min}$ for a period $T_1$.

If signal 32 is increasing, in other words positive after passing through the zero value, then the engine is reversed, and control unit 44 controls generator 48 to alternate signal 36 from value $\mathbf{36}_{min}$ to value $\mathbf{36}_{MAX}$ after remaining at value $\mathbf{36}_{min}$ for a period $T_2$.

Period $T_2$ is separate from period $T_1$. Advantageously, period $T_2$ is twice as long as period $T_1$. In FIG. 3, referenced dotted line 72 symbolizes a reversal of the engine. It is seen that despite the reversal, the value of counter 56 is always in accordance with the number of the tooth that is opposite device 6.

Engine control unit 4 comprises a detection unit 50, a counter 56, and a control unit 52 that is connected to operational elements of an internal combustion engine and in particular spark plugs 68 and fuel injectors 70.

Detection unit 50 detects alternations 64 of signal 36 from value $\mathbf{36}_{MAX}$ to value $\mathbf{36}_{min}$, alternations 66 of signal 36 from value $\mathbf{36}_{min}$ to value $\mathbf{36}_{MAX}$, and period $T_{mes}$ that separates these alternations. If this period is equal to $T_1$, it increments counter 56 after each alternation 64; if it is equal to $T_2$, it decrements counter 56 after each alternation 64. In practice, detected period $T_{mes}$ is compared to the mean of values $T_1$ and $T_2$ to increment or decrement the counter.

When reference position 24 of disk 8 is opposite fixed part 6 of sensor 2, signal 32 does not take on the zero value; signal 36 therefore remains at value $\mathbf{36}_{MAX}$ for a long period that is detected by detection unit 50 and one out of two rotations, counter 56 is brought to zero, so as to know the position of the engine in two crankshaft turns.

This invention is not limited to the embodiment described above, and any modification within the scope of one skilled in the art can be considered.

It is possible, for example, to select a reference value other than the passing of first signal 32 through zero.

It is also feasible to select two or more reference values. Actually, the selection of the passing of signal 32 through the zero value as a reference value comes to use two values: a first value that is the passage through zero in increasing mode 12 and a second value that is the passage through zero in decreasing mode 14. In the example presented above, it is entirely possible to take on two non-zero reference values by selecting them such that one is above the mean value of signal 32 and the other below, so as to allow (based on the phase quadrature between two signals 32 and 34) an immediate identification of the event by comparison of signals 32 and 34.

Likewise, it is entirely feasible to work with first and second signals 32, 34 that are not in phase quadrature but have any phase shift between them, because the fact of comparing signals 32 and 34 makes it possible to reach the desired objective, where devices of the prior art provide erroneous information.

The invention claimed is:

1. Device (1) for determining the position of an internal combustion engine that comprises a rotary element, whereby said device comprises:

A sensor (2) that comprises a rotary part (8) and a fixed part (6), whereby said rotary part (8) is linked to the rotary part and comprises a number of essentially identical reference points (26) that are offset angularly by one increment, whereby said fixed part (6) comprises:

First means (16, 18, 22, 30) for generating a first signal (32) based on the relative position of reference points (26) relative to the fixed part (6), Second means (16, 20) for generating a second signal (34) based on the relative position of the reference points (26) relative to the fixed part (6), whereby said first signal (32) and said second signal (34) are similar but phase-shifted, Means of analysis (10) connected to the first means (16, 18, 22, 30) and to the second means (16, 20), whereby said means of analysis (10) comprise third means (46) for detecting at least one characteristic event (12, 14) on the first signal and fourth means (48) for generating a third signal (36) of binary type that takes on a first value ($\mathbf{36}_{MAX}$) or a second value ($\mathbf{36}_{min}$), whereby said fourth means (18) generate an alternation of the third signal (36) between the first value ($\mathbf{36}_{MAX}$) and the second value ($\mathbf{36}_{min}$) after detection of at least one of characteristic events (12, 14) on the first signal (32), Engine control means (4) connected to the means of analysis of sensor (10), whereby said engine control means (4) comprise:

A counter (56) that is intended to represent the position of the rotary element, Fifth means (50) for detecting the alternations of the third signal (36) between the first value ($\mathbf{36}_{MAX}$) and the second value ($\mathbf{36}_{min}$) and to modify the counter (56) based on said alternations, Sixth means (52) for generating actions on engine elements based on the value of counter (56), characterized in that means of analysis (10) also comprise:

Means of comparison (42) to compare the value of the second signal (34) to a reference value, when a characteristic event (12, 14) is detected on the first signal (32), Control means (44) for controlling the fourth means (48) for alternating the third signal (36) between the first value ($\mathbf{36}_{MAX}$) and the second value ($\mathbf{36}_{min}$) only when a characteristic event (12, 14) is detected on the first signal (32) and when the result of the comparison (58) is positive.

2. Device according to claim 1, wherein:

The means of analysis (10) also comprise seventh means (54) for detecting the variation of the first signal when a characteristic event (12, 14) is detected on the first signal (32) and for comparing it to a reference value, and The fourth means (48) generate an alternation (66) of the second value ($\mathbf{36}_{min}$) with the first value ($\mathbf{36}_{MAX}$) after the second value ($\mathbf{36}_{min}$) is held for a period (T1, T2) based on the result of comparison (60) between the variations of the first signal (32) with the reference value, The fifth means (50) compare to a reference value period (T1, T2) between alternation (64) of the first value ($\mathbf{36}_{MAX}$) with the second value ($\mathbf{36}_{min}$), and the alternation (66) of the second value ($\mathbf{36}_{min}$) with the first value ($\mathbf{36}_{MAX}$), and said means increment or decrement the counter (56) based on a result (62) of this comparison.

3. Device according to claim 1, wherein:

The fixed part of the sensor comprises:

A first probe (18) that generates a fourth essentially sinusoidal signal (38), A second probe (22) that is similar to first probe (18), placed close to the first probe (18) and generating a fifth signal (40) that is essentially similar to the fourth signal (38) but phase-shifted relative to the fourth signal (38), Means (30) for subtracting the fifth signal (40) from the fourth signal (38), generating the first signal (32), The third means (46) detect the shifting of the first signal (32) by the zero value.

4. Device according to claim 3, wherein:

The second means comprise a third probe (20), similar to the first probe (18) and to the second probe (22), placed approximately in the center of the first probe (18) and the second probe (22), whereby the said second signal (34) varies between a minimum value ($\mathbf{34}_{min}$) and a maximum value ($\mathbf{34}_{MAX}$)

The means of comparison (42) compare the value of the second signal (34) to its minimum value ($\mathbf{34}_{min}$) and/or to its maximum value ($\mathbf{34}_{MAX}$), when the characteristic event (12, 14) is detected on the first signal (32).

5. Device according to claim 1, wherein, the fixed part of the sensor comprises a magnet (16), the rotary part of the sensor comprises a number of ferromagnetic teeth (26), and the first means and the second means each comprise a Hall effect probe or a magnetoresistive probe.

6. Process for determining the position of an internal combustion engine that comprises a rotary element, in which:

A sensor (2) that comprises a fixed part (6) and a rotary part (8) is used, whereby the rotary part (8) comprises a number of essentially identical reference points (26) that are offset angularly by one increment, whereby said sensor generates a first signal (32) and a second signal (34) that are similar but phase-shifted, A binary third signal (36) that takes on a first value ($\mathbf{36}_{MAX}$) or a second value ($\mathbf{36}_{min}$) is transmitted from the sensor (2) to an engine control means (4), whereby said process comprises the following stages:

a) A characteristic event (12, 14) is detected on the first signal (32), b) The third signal (36) is alternated from the first value ($\mathbf{36}_{MAX}$) to the second value ($\mathbf{36}_{min}$), c) Alternations (64) of the third signal (36) are detected in the engine control means (4), and the number of alternations of the third signal (36) is counted in a counter (56), d) Actions on the engine elements are generated based on the value of counter (56), wherein during stage a), in addition, the value of the second signal (34) is compared (42) to a reference value, and stage b) is performed only if a result (58) of the comparison between the value of second signal (34) and the reference value during stage a) is positive.

7. Process according to claim 6, wherein:

The variation of the first signal (32) is detected (54) during stage a), During a stage e), said variation is compared to a reference value, and After stage b), the third signal (36) is held at the second value ($\mathbf{36}_{min}$) for a period ($T_1$, $T_2$) based on a result (60) of the comparison between the variation of the first detected signal (32) and the reference value, then the third signal (36) is alternated (66) from the second value ($\mathbf{36}_{min}$) to the first value ($\mathbf{36}_{MAX}$); the period between the alternation (64) of the third signal (36) from the first value ($\mathbf{36}_{MAX}$) to the second value ($\mathbf{36}_{min}$) and the alternation (66) of the second value ($\mathbf{36}_{min}$) to the first value ($\mathbf{36}_{MAX}$) are detected in the engine control means (4), and the counter (56) is incremented or decremented based on the detected period.

8. Process according to claim 6, wherein the period that is detected is compared to the mean of values ($T_1$, $T_2$) for incrementing or decrementing the counter.

9. Process according to claim 7, wherein:

A sensor (2) that generates a fourth signal (38) and a fifth signal (40) that are similar but phase-shifted is used, The first signal (32) is generated by subtracting the fifth signal (40) from the fourth signal (38), and During stage a), passing (12, 14) of the first signal (32) through the zero value is detected.

10. Process according to claim 9, wherein during stage e), it is determined whether the first signal (32) takes on positive values after passing through the zero value.

11. Process according to claim 7, wherein the period that is detected is compared to the mean of values ($T_1$, $T_2$) for incrementing or decrementing the counter.

12. Process according to claim 6, wherein:

A sensor (2) that generates a fourth signal (38) and a fifth signal (40) that are similar but phase-shifted is used, The first signal (32) is generated by subtracting the fifth signal (40) from the fourth signal (38), and During stage a), passing (12, 14) of the first signal (32) through the zero value is detected.

13. Process according to 8, wherein:

A sensor (2) that generates a fourth signal (38) and a fifth signal (40) that are similar but phase-shifted is used, The first signal (32) is generated by subtracting the fifth signal (40) from the fourth signal (38), and During stage a), passing (12, 14) of the first signal (32) through the zero value is detected.

14. Process according to claim 13, wherein during stage e), it is determined whether the first signal (32) takes on positive values after passing through the zero value.

15. Device of claim 1, wherein, the sixth means (52) generates the actions on spark plugs (68) and fuel injectors (70) based on the value of counter (56).

16. Device of claim 6, wherein, the sixth means (52) generates the actions on spark plugs (68) and fuel injectors (70) based on the value of counter (56).

* * * * *